(12) United States Patent
Meijer et al.

(10) Patent No.: US 6,256,031 B1
(45) Date of Patent: Jul. 3, 2001

(54) INTEGRATION OF PHYSICAL AND VIRTUAL NAMESPACE

(75) Inventors: Ronald Meijer, Kirkland; Douglas C. Hebenthal, Redmond; Lara N. Dillingham, Redmond; Kim A. Stebbens, Redmond; James D. Jacoby, Snohomish; Anthony C. Romano, Redmond, all of WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/105,398

(22) Filed: Jun. 26, 1998

(51) Int. Cl.[7] .................................................. G06F 13/00
(52) U.S. Cl. .......................... 345/357; 707/203; 707/205
(58) Field of Search .................................. 345/356, 357; 707/1–4, 100–104, 201–206

(56) References Cited

U.S. PATENT DOCUMENTS

| | | | | |
|---|---|---|---|---|
| 5,465,365 | * | 11/1995 | Winterbottom | 395/600 |
| 5,500,929 | * | 3/1996 | Dickinson | 345/160 |
| 5,588,147 | * | 12/1996 | Neeman et al. | 395/601 |
| 5,689,700 | * | 11/1997 | Miller et al. | 395/610 |
| 5,801,702 | * | 9/1998 | Dolan et al. | 345/357 |
| 5,842,214 | * | 11/1998 | Whitney et al. | 707/10 |
| 5,864,870 | * | 1/1999 | Guck | 707/104 |
| 5,956,028 | * | 9/1999 | Matsui et al. | 345/329 |
| 6,047,332 | * | 4/2000 | Viswanathan et al. | 709/245 |
| 6,061,692 | * | 5/2000 | Thomas et al. | 707/200 |
| 6,061,743 | * | 5/2000 | Thatcher et al. | 709/302 |

* cited by examiner

*Primary Examiner*—Ba Huynh
(74) *Attorney, Agent, or Firm*—Michalik & Wylie, PLLC

(57) ABSTRACT

A system and method of integrating the physical and virtual namespaces of a site into a single hierarchical representation thereof that reflects the hierarchical arrangement of the site as perceived by the client. A dynamic namespace integration mechanism is implemented as a part of a site management service to look up and integrate hierarchically organized directory information maintained in a registry (e.g., metabase) for both physical and virtual directories. The administrator is then given a view of the site that corresponds to the view of the client browsing the site. The administrator may interface with a user interface displaying the integrated namespace to manage the properties under a site's directories. The hierarchical relationships between the physical and virtual directories enable the administrator to set properties on parent nodes that are inheritable by child nodes, simplifying management tasks.

30 Claims, 10 Drawing Sheets

INTEGRATION OF PHYSICAL AND VIRTUAL NAMESPACE

FIELD OF THE INVENTION

The invention relates generally to computer systems, and more particularly to the management of information servers.

BACKGROUND OF THE INVENTION

Developers of Web sites or FTP (file transfer protocol) sites, particularly complex sites, first need to determine how the various files of that site are to be organized. Then, appropriate directories are created according to the planned organization, for example, separate directories are created for storing HTML (Hypertext Markup Language) pages and for storing program files, e.g., Active Server Pages (ASP) applications or custom programs. Once created, the directories containing the documents that are to be published are specified to a management service or the like. One of the directories is a home directory, which is the root directory for a site wherein content files are stored. The home directory is accessible to the user and contains files and programs, and typically contains the home page, i.e., the initial page of information for a collection of pages. In other words, the home directory is the central location for published pages, and often includes a home page or index file that welcomes users and contains links to other pages in the site.

In general, two types of directories may be created, virtual directories and physical directories. A physical directory is one that is under the home directory, while a virtual directory is any directory not contained within the home directory. For example, a virtual directory may correspond to a different local drive of the same machine, or a network drive, and may be used so that the one drive having the home directory thereon is not overly burdened. Virtual directories are typically used for complex sites or to specify different URLs (Uniform Resource Locators) for different parts of a site.

Both virtual and physical drives appear to client browsers as if they were within the home directory, i.e., they may be accessed below the home page in some hierarchical manner. For example, a user may type http://exair to access a site's home page and http://exair/samples to access another page or the like on that site below the home page. Although to the user it appears that the exair/samples page is within the exair/home directory, in actuality the files on that page physically may be on a different local or remote network disk drive. The user does not know of the actual underlying organization, but only perceives the URL path hierarchy.

Network administrators, however, have heretofore always had to deal with the actual locations of the directories. This is because administrative tools are device-oriented rather than site-oriented. For example, to change a property on a file under the home directory, the administrator would use a local user interface, while to change a property on a remote file, the administrator would use a user interface for remote operation, such as a network browser. In other words, in existing site management applications and tools, the physical and virtual namespaces are displayed as different entities. Further, existing management tools have not provided any indication of the site's hierarchy, whereby to manage a site, the administrator must work through various mappings in order to locate the various directories and files therein. As a result, if there is some relationship between properties of files, the administrator is unable to take advantage of this relationship. In particular, when files are stored at different physical locations, the administrator must not only work with the individual files, but also must do so via the distinct types of management tools.

SUMMARY OF THE INVENTION

Briefly, the present invention provides a system and method of integrating the physical and virtual namespaces of a site into a single hierarchical representation thereof. In general, the various physical and virtual directories are represented in a single integrated namespace of nodes that reflects the hierarchical arrangement of the site as perceived by the client. To this end, a dynamic namespace integration mechanism is implemented as a part of a site management service, and looks up information maintained in a registry (e.g., metabase) for the physical and virtual directories, mapping the virtual directories to their appropriate actual locations as necessary. The administrator then has a view of the site that corresponds to the view of the client browsing the site, i.e., in a hierarchy of the physical directories and the virtual directories mirroring the hierarchy of the URLs. The administrator may then manage the files under the directories in the namespace via the same entity, such as by setting property values via a user interface of a management tool. Moreover, the hierarchical relationships between the physical and virtual directories enable the properties to inherit properties set on their parent nodes, simplifying management tasks. These properties can span from virtual directories to physical directories or physical directories to virtual directories.

Other advantages will become apparent from the following detailed description when taken in conjunction with the drawings, in which:

DETAILED DESCRIPTION

Exemplary Operating Environment

Figure 1:
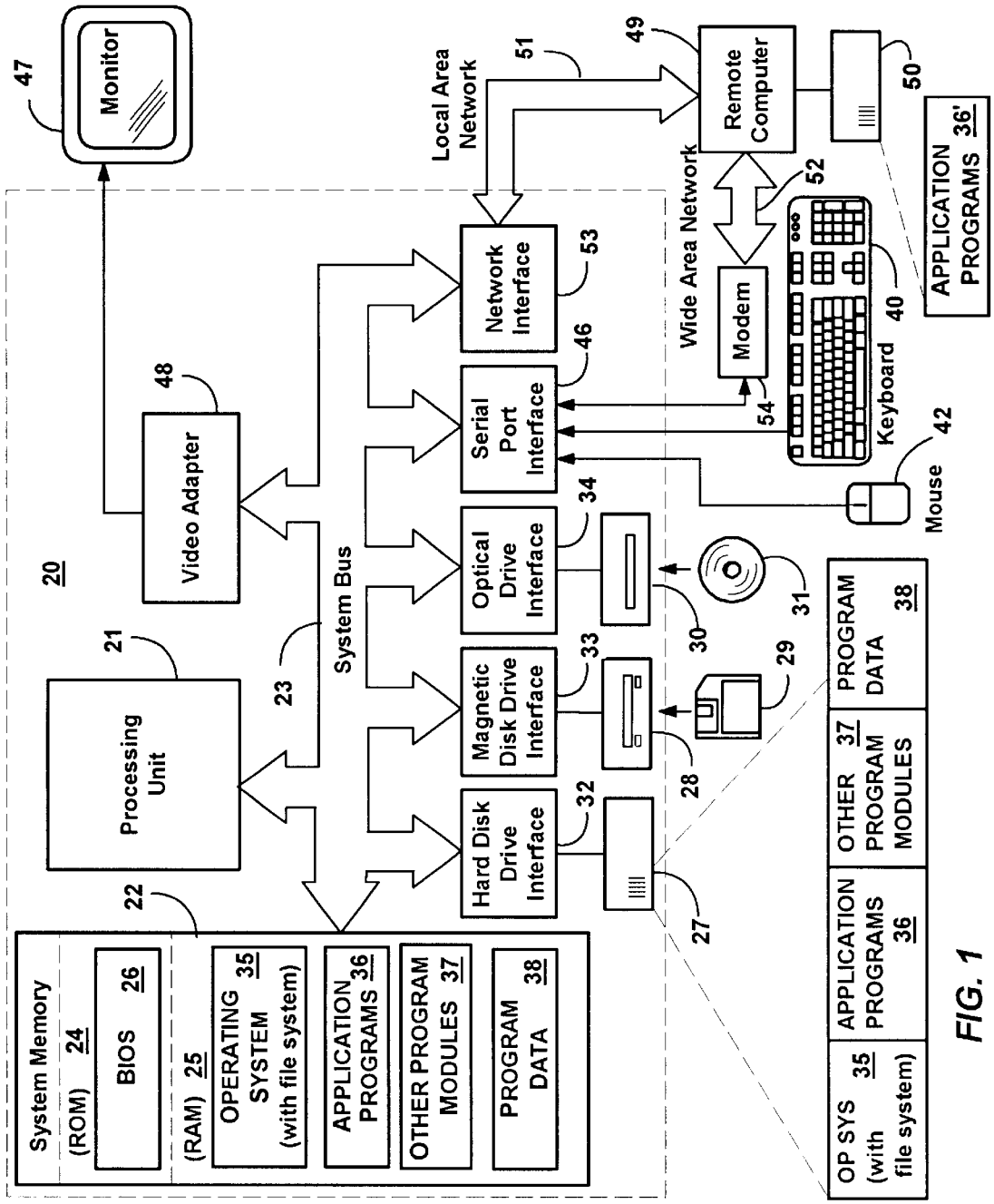
FIG. 1 is a block diagram representing a computer system into which the present invention may be incorporated.

FIG. 1 and the following discussion are intended to provide a brief general description of a suitable computing environment in which the invention may be implemented. Although not required, the invention will be described in the general context of computer-executable instructions, such as program modules, being executed by a personal computer. Generally, program modules include routines, programs, objects, components, data structures and the like that perform particular tasks or implement particular abstract data types. Moreover, those skilled in the art will appreciate that the invention may be practiced with other computer system configurations, including hand-held devices, multiprocessor systems, microprocessor-based or programmable consumer electronics, network PCs, minicomputers, mainframe computers and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a general purpose computing device in the form of a conventional personal computer 20 or the like, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read-only memory (ROM) 24 and random access memory (RAM) 25. A basic input/output system 26 (BIOS), containing the basic routines that help to transfer information between elements within the personal computer 20, such as during start-up, is stored in ROM 24. The personal computer 20 may further include a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD-ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide non-volatile storage of computer readable instructions, data structures, program modules and other data for the personal computer 20. Although the exemplary environment described herein employs a hard disk, a removable magnetic disk 29 and a removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs), read-only memories (ROMs) and the like may also be used in the exemplary operating environment.

A number of program modules may be stored on the hard disk, magnetic disk 29, optical disk 31, ROM 24 or RAM 25, including an operating system 35, (including a file system therein and/or associated therewith), one or more application programs 36, other program modules 37 and program data 38. A user may enter commands and information into the personal computer 20 through input devices such as a keyboard 40 and pointing device 42. Other input devices (not shown) may include a microphone, joystick, game pad, satellite dish, scanner or the like. These and other input devices are often connected to the processing unit 21 through a serial port interface 46 that is coupled to the system bus, but may be connected by other interfaces, such as a parallel port, game port or universal serial bus (USB). A monitor 47 or other type of display device is also connected to the system bus 23 via an interface, such as a video adapter 48. In addition to the monitor 47, personal computers typically include other peripheral output devices (not shown), such as speakers and printers.

The personal computer 20 may operate in a networked environment using logical connections to one or more remote computers, such as a remote computer 49. The remote computer 49 may be another personal computer, a server, a router, a network PC, a peer device or other common network node, and typically includes many or all of the elements described above relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, Intranets and the Internet.

When used in a LAN networking environment, the personal computer 20 is connected to the local network 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

The Management Console, Internet Service Manager and Metabase

Although not necessary to the present invention, in one preferred implementation, the present invention may be used with the Microsoft Management Console (MMC), a common management console that provides a consistent framework useable by network administration programs. In general, the MMC framework provides consoles, each of which integrates the tools, information, and views of a network required to perform an administrative task. A network administrator may use such a console 60 (FIG. 2) to manage the network, or provide the console to others to perform an administrative task. It should be noted that MMC does not by itself actually administer any part of a network, but rather, MMC displays consoles that host programs sometimes referred to as snap-ins, and the snap-ins administer the various parts of the network.

Figure 2:
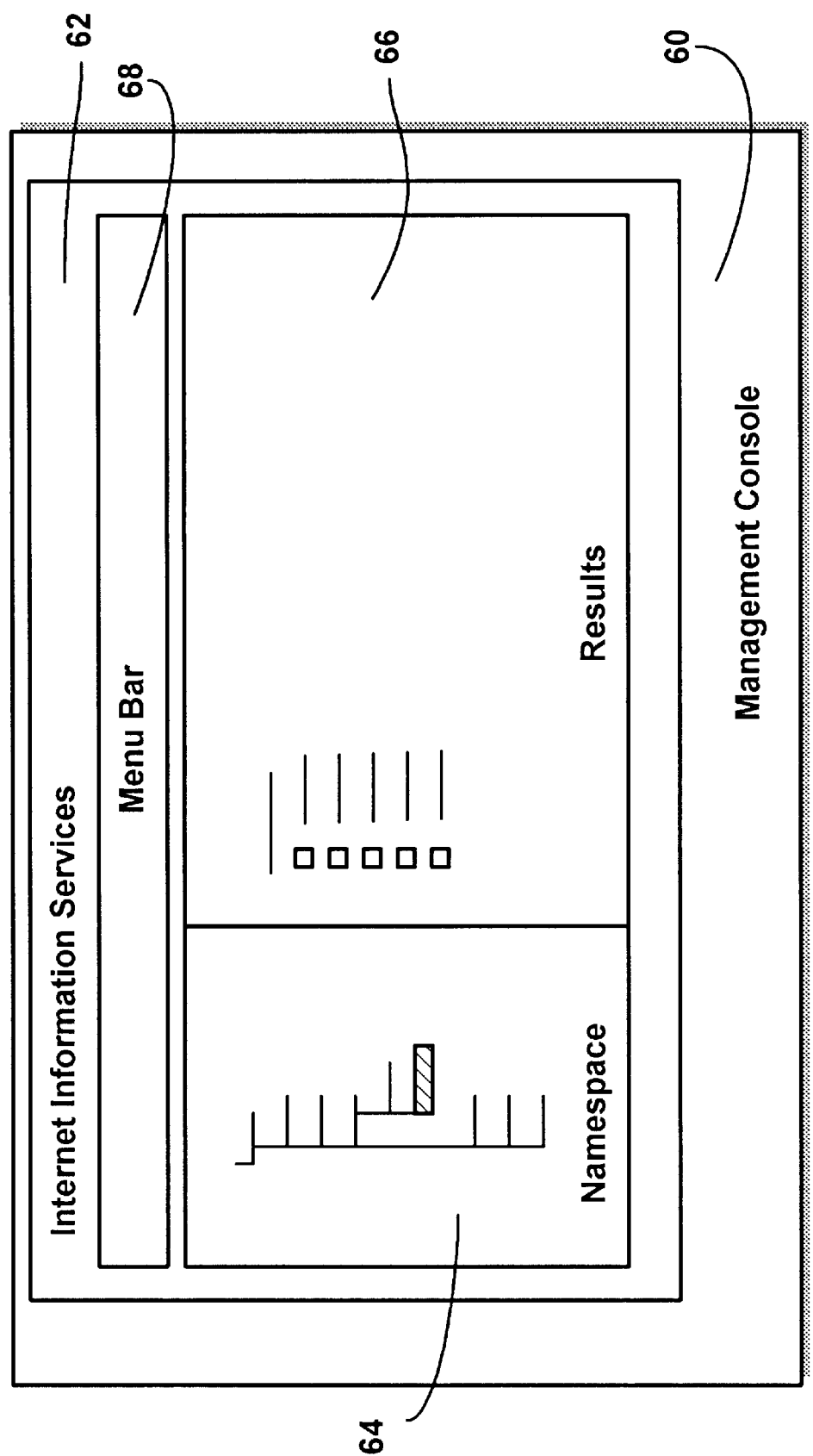
FIG. 2 is a block diagram representing a general management framework in which the present invention may be utilized.

Microsoft Corporation's Internet Information Server 4.0 includes one such snap-in, the Internet Service Manager 62 (FIG. 2). The Internet Service Manager 62 is an administration tool that enables the management and administration of web sites or FTP sites, for example, to identify which directories are part of a site. For purposes of simplicity herein, the invention will primarily be described with respect to web sites, or simply sites, although it is understood that the invention is also intended to be used with FTP sites. In any event, the Internet Service Manager may administer servers on a local network, or across the Internet.

When the Internet Service Manager is started, an MMC console starts and loads the Internet Service Manager snap-in. As generally shown in FIG. 2, each console 60 in the Management Console includes one or more windows, each window having two panes 64, 66. The left pane 64 is referred to as the "scope" pane, (or herein as a namespace), and shows a tree view of a namespace, which is the hierarchy of all the items (nodes) that can currently be managed. By way of analogy, the tree view of the namespace may be similar to Microsoft Windows NT® Explorer view of files and folders on a hard disk. Each item (i.e., node) is one of a variety of objects, tasks, or containers.

When a node in the namespace 64 is selected, the right pane, referred to as the "results" pane 66, displays the results of that selection. The results may be a list of what is contained by the selected item, a Web page providing management information, or another kind of management view, such as a property page or Performance Monitor graph. In a management view, the network may be administered by taking action on the contents of the results pane, changing options or executing commands represented by toolbars and/or command menus. One or more menu bars 68 may provide the toolbars and/or command menus. One of the primary uses of the results pane 66 by the Internet Service Manager 62 is to provide a mechanism for managing a site by setting properties thereof.

Figure 3:
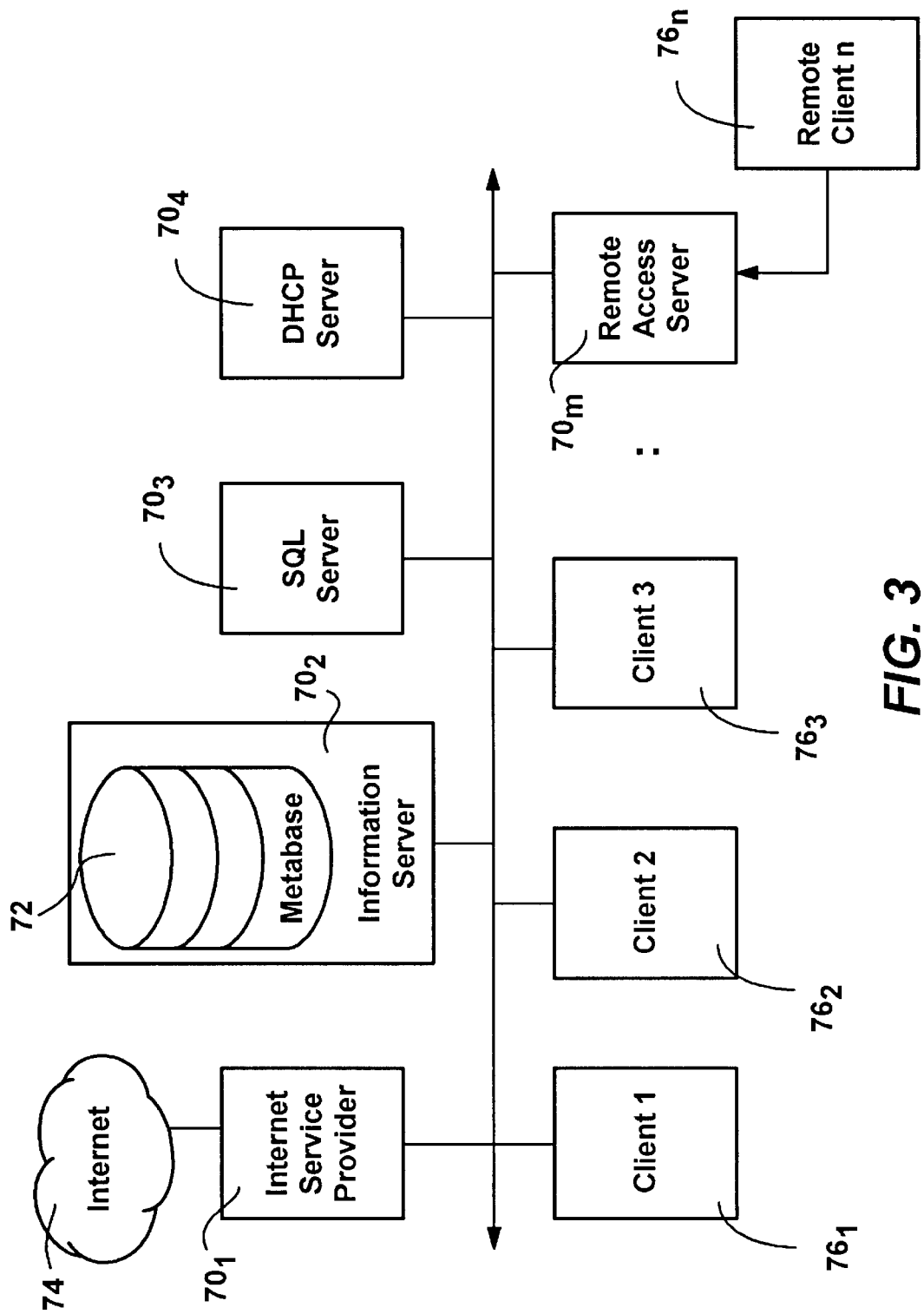
FIG. 3 is a block diagram generally representing a exemplary network of clients and servers including an information server having a metabase therein.

FIG. 3 represents a typical network in which the present invention may be implemented to facilitate management of a web site. As shown in FIG. 3, a number of servers $70_1$–$70_m$ are connected to the network, although it is understood that many other ways of configuring a network configuration are feasible. In any event, one of the servers (e.g., $70_1$) may connect the network to the Internet 74. Although not necessary to the present invention, as also shown in FIG. 3, one of the servers $70_2$ is referred to as an information server, which as described below, maintains the hierarchical information of the virtual directories of at least one site therein in a specialized database referred to as a metabase 72. The information server $70_2$ typically services information requests from various clients such as the clients $76_1$–$76_n$. Client access to the information server $70_2$ may be via a network communications link, such as in a local area network (LAN) configuration, or via a remote access server or the like, such as the remote access server $70_m$. In addition, the information server $70_2$ may also be connected to the Internet service provider server $70_1$, whereby requests for information may come from clients connected to the Internet 74.

The network configuration may also contain other servers such as a SQL server $70_3$ and/or a DHCP server $70_4$. The DHCP server $70_4$ typically provides Internet Protocol (IP) addresses to the clients, while the SQL server $70_3$ is representative, for example, of various other types of servers that provide information to or receive information from other network clients (including the other servers).

Figure 4:
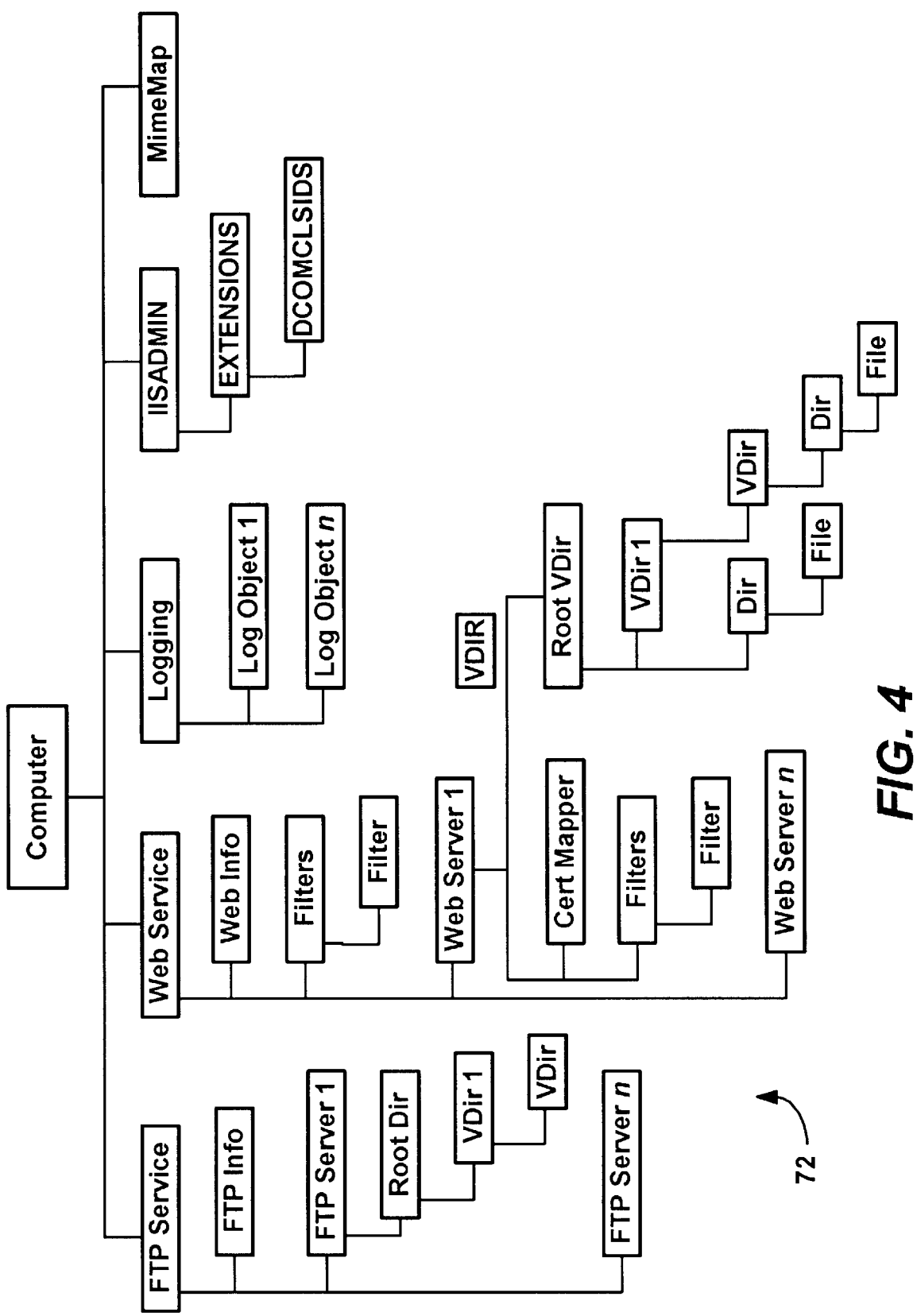
FIG. 4 is a representation of the hierarchical arrangement of an exemplary metabase including directory information stored therein.

Although not necessary to the present invention, the properties and other management information of sites are preferably maintained in the metabase 72. The metabase 72 is described in detail in U.S. patent application Ser. No. 08/963,894, filed Nov. 4, 1997, entitled "System and Method for Administering a Meta Database as an Integral Component of an Information Server," assigned to the Assignee of the present invention and herein incorporated by reference in its entirety. In general, the metabase 72 provides a hierarchically organized database for storing configuration metadata, (i.e., properties), content metadata and application metadata. FIG. 4 shows the hierarchical organization of one such metabase, including virtual directories and files thereunder.

In general, the metabase 72 is accessed through a suitable interface to service requests of the Internet Information Server 62, (such as in the client 763), including requests directed to the hierarchical organization of a site. Other requests include requests to retrieve and set property values of the metabase 72. Note, however, that in addition to accessing the metabase 72, the Internet Information Server 62 may further access information stored in a local storage through the file system 35, and/or also from some other source, e.g., another server of the network.

As shown in FIG. 4, the metabase 72 comprises a variety of storage locations organized in a hierarchical fashion. The storage locations are sometimes referred to as key locations, or more simply keys. At each individual key, one or more properties may be stored, including the properties of a site. Properties contain configuration and other types of metadata. The metadata stored may generally be broken down into three categories, a first of which is configuration metadata. Configuration metadata includes properties and settings which apply to information server operating system services. Such services are illustrated in FIG. 4, by way of example and not limitation, by the web service and the FTP service. Such configuration metadata may include various configuration options for the various services. An example of such configuration metadata is an http port number.

A second category of metadata is content metadata. Content metadata includes properties which apply to the objects served and managed by an information server, for example, content rating information for various information objects on the information server. Another example of content metadata is access privileges that describe the type of access that a client may have for a particular location or object.

A third category of metadata suitable for storage in a metabase of the present invention is application metadata. Application metadata includes properties stored by an application or extension to the information server. Examples of such applications or extensions to the information server include other entities that utilize or operate in conjunction with the information server, for example, a component that retrieves real-time or near real-time information such as stock quotes and provides them in response to a request. Application metadata is typically stored or used by such an application or extension at initialization or run time to affect their behavior. Such behavior may either be in configuration or may be in the type of data or response returned. Examples of application metadata may include a property that indicates that a directory should be indexed, the name of a server name to connect to in order to retrieve real time data, or objects which retrieve real time data or pointers to objects which retrieve real time data.

The metabase may include multiple virtual servers of any given type. For example, although only a single FTP service and a single web service is illustrated in FIG. 4, such services may in turn implement several virtual servers that look to the outside world like separate servers, although in reality, are implemented by a single service. Thus, the metabase may have several keys, each corresponding to a different virtual server. Keys at this location are used to store properties influencing how the virtual servers are configured or how they operate.

Keys directly below the server keys correspond to root virtual directories, subordinate virtual directories, disk directories, and information objects. Virtual directories have no direct correlation in the physical storage media, while physical directories have a direct counterpart in the physical storage media. In some situations, virtual root directories may be mapped to a physical counterpart that may not be a root directory. Other keys illustrated in FIG. 4 also correspond to various objects of the information server installation.

Figure 5:
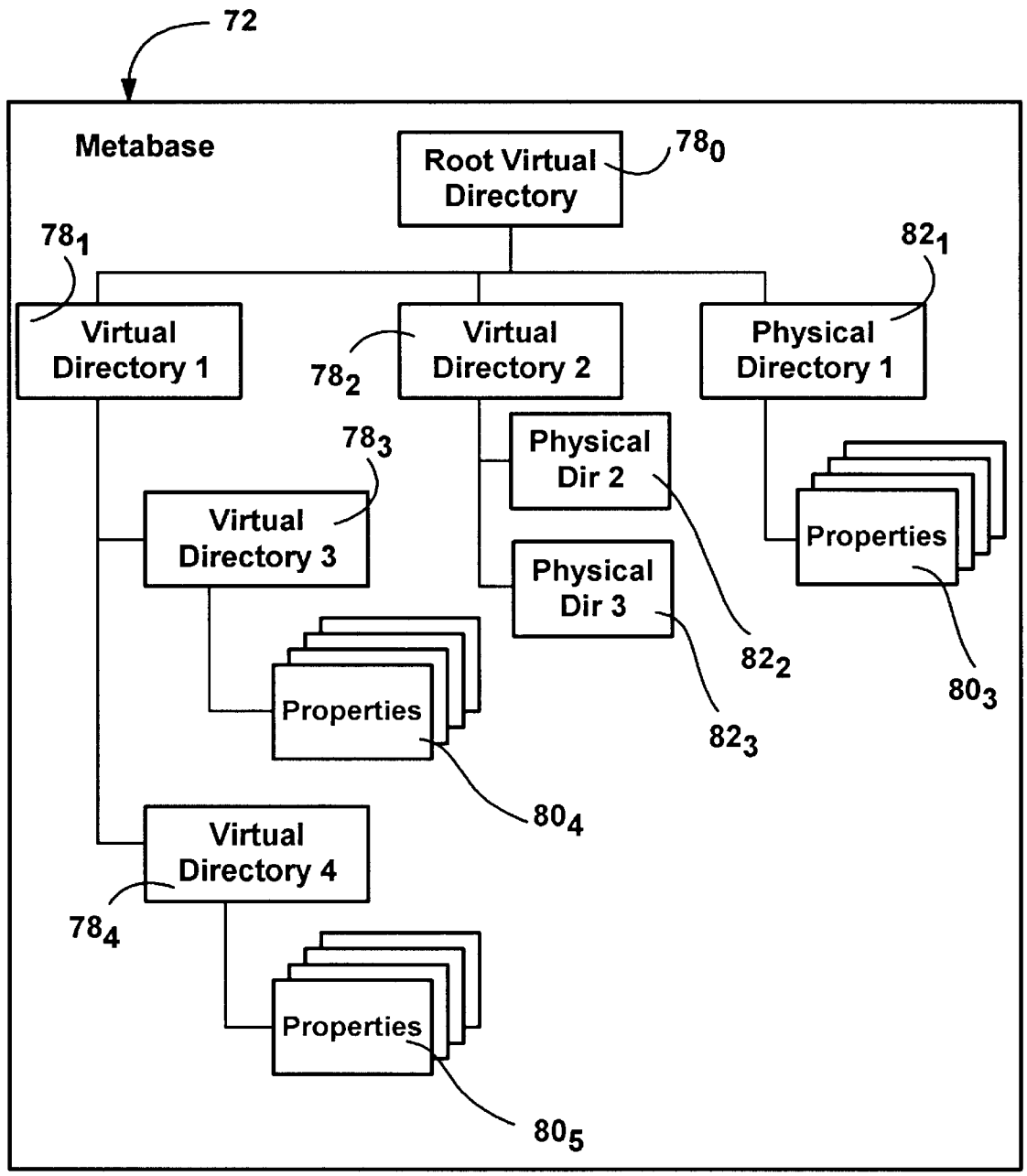
FIG. 5 is a representation of the hierarchical arrangement of directories in a metabase including properties maintained in those directories.

Thus, as shown in FIGS. 4 and 5, certain of the metabase keys may correspond to virtual directories, while others may correspond to physical directories. Each key typically contains properties that affect the configuration of its associated element, and the metabase hierarchical structure typically mirrors the structure of an information server installation. For example, in the partially-depicted metabase 72 of FIG. 5, the keys represent the hierarchical organization of the directories $78_0$–$78_4$, $82_1$–$82_3$ of a hypothetical website, starting with a root virtual directory $78_0$.

In FIG. 5, the ability to store one or more properties at each key is illustrated by the various property boxes attached to the individual keys. As described above, the keys in a metabase are organized according to a hierarchy, such as that illustrated in FIG. 5, and are analogous to a directory in a file system. Thus, the metabase may be accessed to determine this hierarchy, and once determined, the key locations are addressable by a path name having various constituent names separated by a separator, e.g., \\Computer\Web Service\Web Server 1 (FIG. 4).

For purposes of simplicity, a detailed discussion of the various properties that may be set to manage a web site, such as those stored in a metabase, is not set forth herein. However, it should be noted that properties may be virtually any type of data desired to be stored, in virtually any format, including strings, words, or binary data.

Integration of Physical and Virtual Namespace

As described above, the content of a site may be organized into virtual directories and physical directories. Virtual directories are those that are not within the home directory, and which have an alias, a name that client browsers use to access that directory. Aliases provide a number of benefits, including making it easier for administrators to move directories in a site. More particularly, instead of changing the URL for the directory, to move a directory, the mapping between the alias and the physical location of the directory is changed. Also, because an alias is usually shorter than the path name of the directory, it is more convenient for users to type. Moreover, an alias is more secure, because with an alias, users do not know where files are physically located on the server, and thus cannot use that information to modify the files.

By way of example, consider the setting up of a Web site called "ExAir" on a company's intranet for information related to an airline. The following table shows the mapping between the physical location of the files and the URL that accesses the files.

TABLE 1

Physical location and Alias mapping on Server Exair

| Actual Location | Alias | URL Path |
|---|---|---|
| C:\Wwwroot | home directory (none) | http://exair |
| \\Server2\Scripts\Admin | SiteAdmin | http://exair/siteadmin |
| C:\Wwwroot\FreqFlier | None | http://exair/freqflier |
| C:\Wwwroot\Images | None | http://exair/images |
| D:\Mktng\PR | PR | http://exair/pr |

Note that the physical directories may be considered as not having an alias, or alternatively, as having as their alias their precise pathname. In any event, as can be readily appreciated, /SiteAdmin and /PR are aliases for virtual directories actually located at \\Server2\Scripts\Admin and D:\Mktng\PR, respectively. Note that the client views the site via its URL path, and thus can see the hierarchical organization of the site, but has no idea of the actual locations of the directories.

Figure 6A:
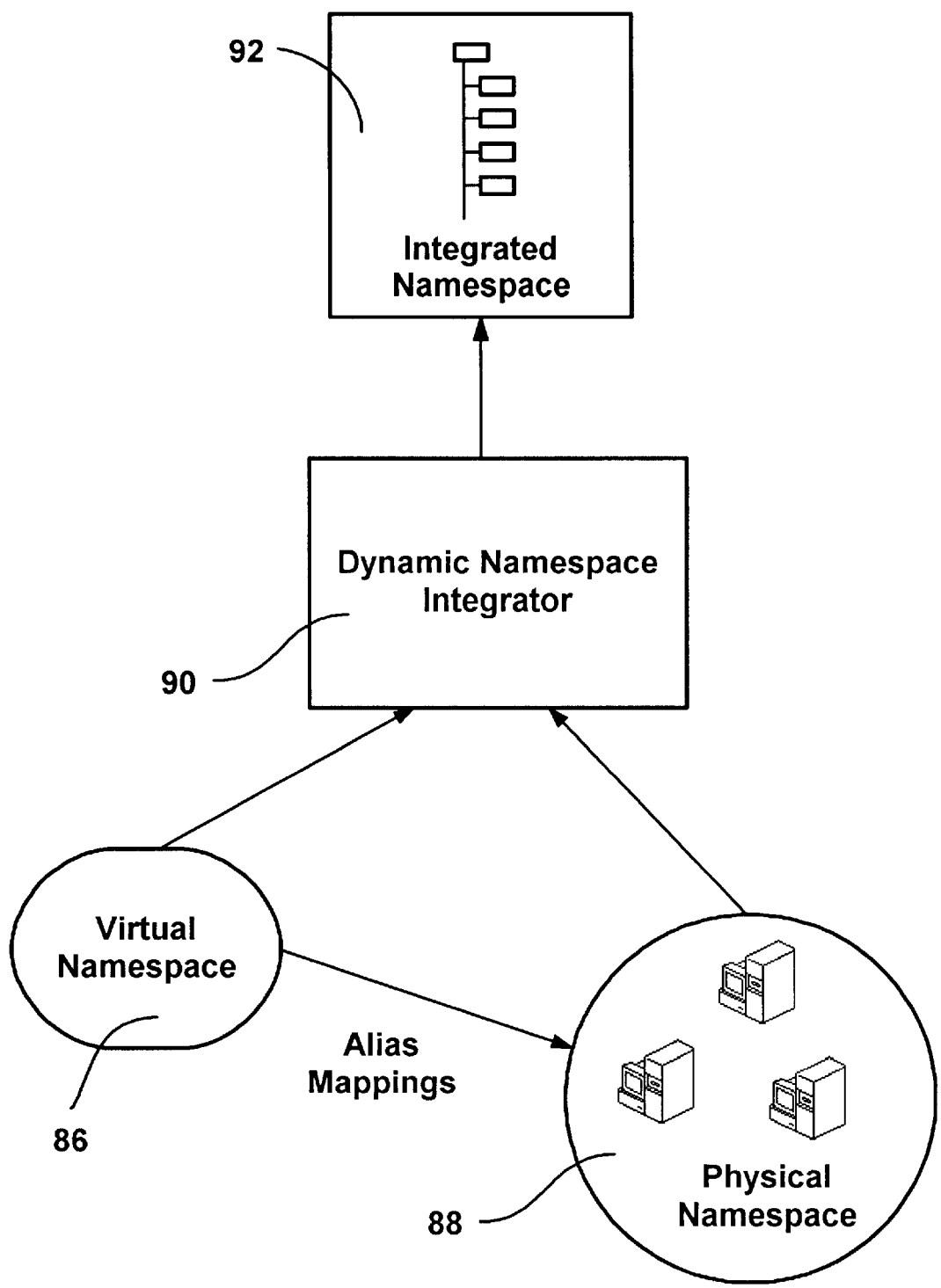
FIGS. 6A and 6B are block diagrams showing various conceptual and representative components, respectively, for integrating physical and virtual namespace information into an integrated namespace in accordance with one aspect of the present invention.

In accordance with one aspect of the present invention, the namespaces of virtual and physical directories are integrated into a common namespace in a hierarchical representation thereof. In this manner, an administrator may manage a site in a single namespace organized in the same hierarchy as perceived by the client. To this end, as generally represented in FIG. 6A, the virtual namespace 86 is merged with the physical namespace 88 by a dynamic namespace integrator 90 into an integrated namespace 92. Note that the alias mappings map the virtual namespaces to their actual physical locations.

The virtual directories are listed in the metabase 72, along with any physical directories that have explicit properties set. However, physical directories that have no properties explicitly set, (i.e., those that only inherit properties from a parent), are not listed in the metabase 72, and thus the list in the metabase 72 may be an incomplete list of a site's directories. As a result, at rendering time, the dynamic namespace integrator 90 not only reads from the metabase 72, but also recursively searches for physical directories in the physical namespace below the home directory and the virtual directories therein.

Figure 6B:
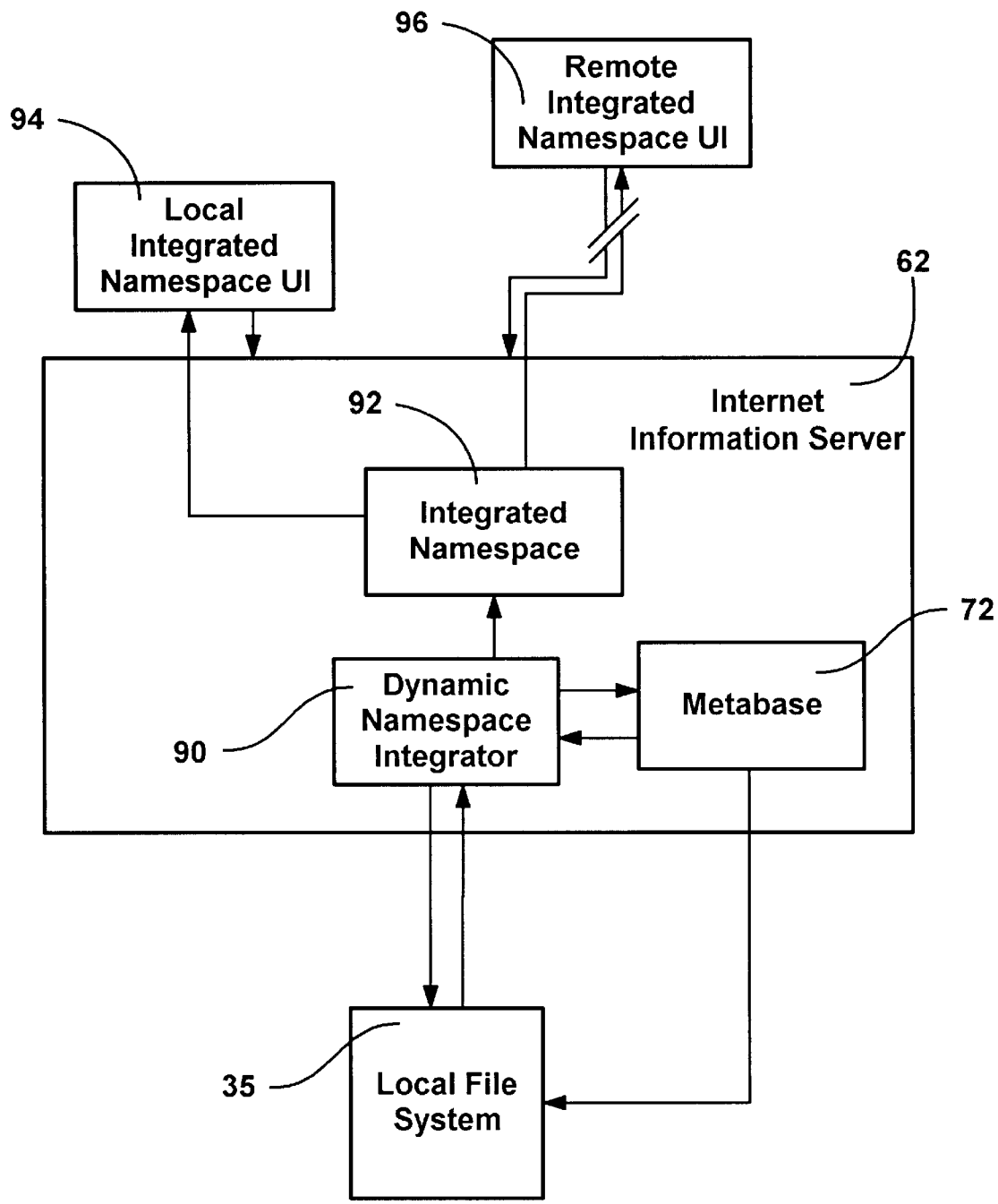

To accomplish the integration using the described components exemplified herein, as shown in FIG. 6B, the Internet Information Service 62 includes the dynamic namespace integrator 90. In general, at rendering time, the dynamic namespace integrator 90 accesses the metabase 72 and the file system 35 to determine the hierarchy of the directories for a selected site, and then maintains the information in storage as an integrated namespace 92. Note that the real integration takes place dynamically at rendering time, as the dynamic namespace integrator 90 accesses its local file system 35 as needed, e.g., to integrate the physical directories that do not have any explicit properties set. An appropriate local user interface 94 or remote user interface 96 portion of the Internet Information Service 62/management console 60 then provides the integrated namespace 92 to the administrator for managing the site. Note that for virtual directories, the user interface 94 (local, FIG. 8) or 96 (remote, FIG. 9) displays the corresponding alias. Whenever there is a collision between a physical directory and a virtual directory with the same name, the physical directory is not displayed in the hierarchy. This is to reflect the client browsing experience, because a browsing client is given the virtual directory, and would never be able to "see" the physical directory with the same name.

Figure 7:
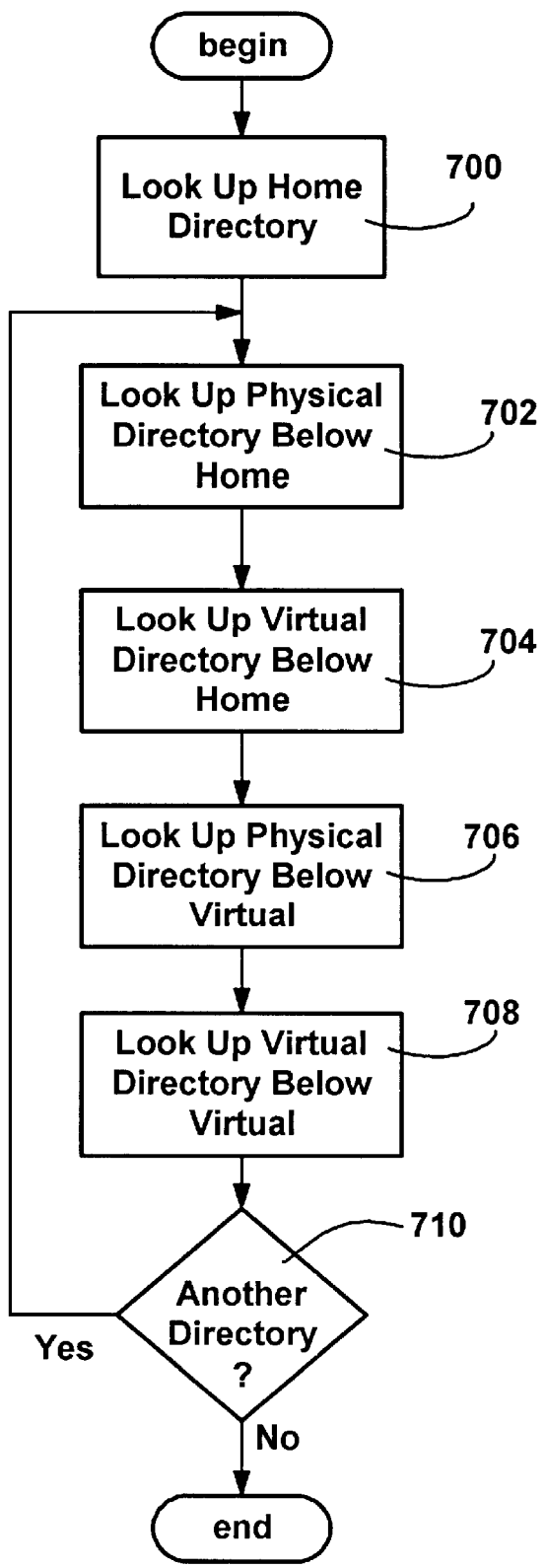
FIG. 7 is a flow diagram generally representing the steps taken to look up and the various namespaces in a hierarchical manner to provide a hierarchical representation thereof in an integrated namespace in accordance with one aspect of the present invention.

FIG. 7 shows the general steps taken to determine the integrated hierarchy, beginning at step 700 wherein the home directory of a selected site is first looked up in the metabase 72. Thereafter, the various physical (step 702) and virtual (step 704) directories below the home directory are similarly looked up, followed by any physical directories below the virtual directory that was just looked up (step 706), and any virtual directories below (step 708). The process repeats recursively until no directories remain to be enumerated. Note that if a user requests enumeration of a lower directory that is not already enumerated, (e.g., in FIG. 8 by clicking on the plus sign to the left thereof in the scope pane), the directories below that lower directory are enumerated by looking them up in the same general manner.

Figure 8:
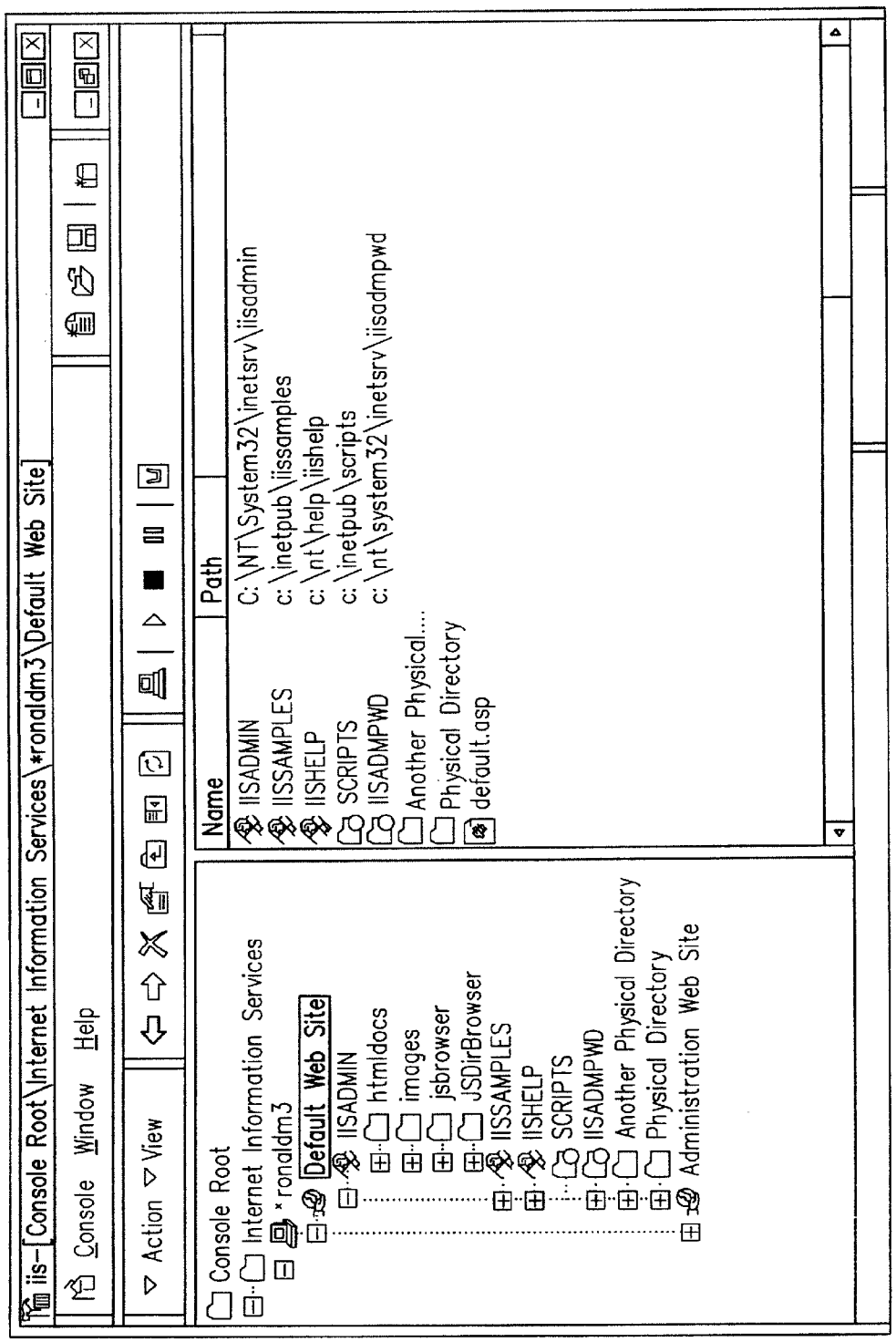
FIGS. 8 and 9 are representations showing two examples of user interfaces having integrated namespaces for managing a site's configuration information either locally and remotely, respectively.
Figure 9:
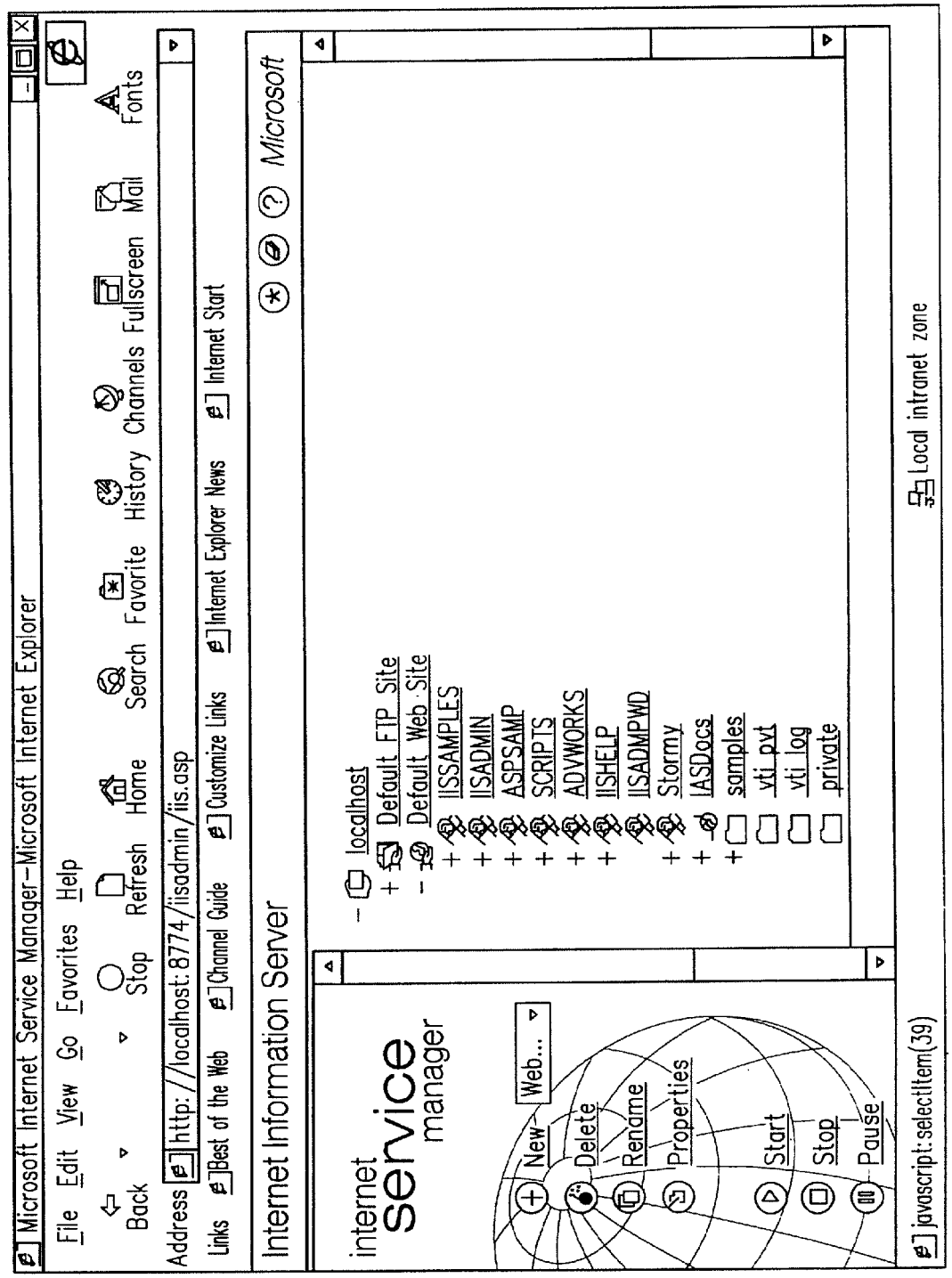

Thus, once the node that represents the site is selected via the Internet Information Service 62, the directories are enumerated in the scope pane and/or the results pane. FIG. 8 shows one such user interface 94 for local administration, i.e., an "Explorer" view, which gives a typical example of the hierarchical listing integrating virtual directories (e.g., IISADMIN, SCRIPTS) and the physical directories which exist in parallel in the virtual namespace (e.g., "Physical Directory" and "Another Physical Directory"). FIG. 9 shows another such user interface 96 for remote administration. As can be seen, both user interfaces provide the virtual and physical namespaces in a single integrated namespace in accordance with the site's hierarchical organization as maintained in the metabase. Moreover, although not necessary to the present invention, as shown in FIGS. 8 and 9, the icon beside each directory may be used to provide visual feedback in order to distinguish the virtual directories from the physical directories, e.g., virtual directory icons are shown as having a globe with the represented folder. Icons also may be used to indicate applications and errors.

Once the integrated directories are displayed, the administrator may traverse the namespace tree to locate a desired directory, such as to retrieve and/or set one or more properties therein. Note that as mentioned above, each node in the hierarchy can have its children enumerated, which in the case of virtual directories, means that the physical path that the virtual directory points to is automatically used for the enumeration of the physical directories that exist underneath it. Again, these physical directories are integrated in the namespace view with virtual directories that are configured to exist in this location in the namespace. As can be readily appreciated, no switching between management tools is needed to manage a site's properties. The setting of properties in a metabase is described in the aforementioned U.S. patent application Ser. No. 08/963,894, and thus for purposes of simplicity will not be described herein in detail.

In keeping with the invention, the properties maintained on different physical locations may now benefit from the concept of property inheritance. With inheritance, (also described in the aforementioned U.S. patent application Ser. No. 08/963,894), the property set for a parent node is inheritable by all child nodes. For example, during the installation of Internet Information Server, default values were assigned to the various properties on the property sheets. Properties may thereafter be set on the site level, directory level, and even on the file level. Settings on higher levels (such as the site level) are automatically passed on, or inherited, by the lower levels (such as the directory level) but can still be individually edited at the lower level. Once a property has been changed on an individual site, directory, or file, changes to the master defaults will not automatically override the individual setting.

Thus, with the present invention, an administrator may set a property on a virtual directory that is inheritable by both physical and virtual directories. As can be readily appreciated, this simplifies the task of creating and maintaining a metabase or the like for a site. For example, a system administrator who organizes a logical metabase hierarchy where key locations may share inherited data to the maximum extent possible will only need to administer those key locations possessing the original property. Thus, entire subtrees may be administered by setting a single property in a single location. The ability to override properties that are inherited also allows a great degree of flexibility in collecting data together that may share many, but not necessarily all, properties in common.

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. In a computer system, a method of representing a site having a hierarchical organization as perceived by a client, comprising:

looking up first namespace information representing vitual directories of the site, the virtual directories having alias mappings that map the namespace information of the virtual directories to their physical locations, looking up second namespace information representing physical directories of the site, and integrating the first and second namespace information into an integrated namespace that is hierarchically organized to reflect the hierarchical organization of the site as perceived by the client and to enable information to be automatically propagated across the virtual and physical directories based on the hierarchical organization of the integrated namespace.

2. The method of claim 1 wherein the integrated namespace comprises a hierarchical representation of the directories of the site.

3. The method of claim 1 wherein the virtual directories are represented by an alias in the integrated namespace.

4. The method of claim 1 wherein the step of looking up first namespace information comprises: accessing a registry.

5. The method of claim 4 wherein the registry is a metabase including properties under the directories.

6. The method of claim 1 further comprising: displaying the integrated namespace in a user interface.

7. The method of claim 6 further comprising: receiving user input via the user interface, displaying a property sheet in response to the user input, receiving additional user input corresponding to a property setting, and recording the property setting.

8. The method of claim 7 wherein recording the property setting comprises storing the property setting in a metabase.

9. The method of claim 6 further comprising: receiving user input via the user interface corresponding to an enumeration request of a selected directory, looking up at least one child directory hierarchically below the selected directory, and displaying the at least one child directory on the user interface.

10. The method of claim 6 further comprising: receiving user input via the user interface corresponding to a selected directory, displaying a property sheet in response to the user input, receiving additional user input on the property sheet corresponding to a property setting, and wherein the information is automatically propagated across the virtual and physical directories based on the hierarchical organization of the integrated namespace by recording the property setting in a registry under the selected directory and at least one child directory thereof such that the child directory inherits the property setting.

11. In a computer system, a system for providing a representation of a site having a hierarchical organization as perceived by a client, comprising, a virtual namespace including virtual directory information of the site, a physical namespace including physical directory information of the site, a dynamic namespace integrator configured to integrate the virtual namespace and the physical namespace into an integrated namespace that is hierarchically organized to reflect the hierarchical organization of the site as perceived by the client, and a user interface for displaying the integrated namespace and configured to enable information to be automatically propagated across the virtual and physical directories based on the hierarchical organizing of the integrated namespace.

12. The system of claim 11 wherein the dynamic namespace integrator integrates the virtual namespace and the physical namespace into a hierarchical representation of the directories of the site.

13. The system of claim 11 further comprising a map of virtual directories to aliases representative thereof, and wherein each of the virtual directories are represented by an alias in the integrated namespace.

14. The system of claim 11 further comprising a registry for maintaining the virtual namespace.

15. The system of claim 14 wherein the registry is a metabase including properties under the directories.

16. The system of claim 11 further comprising a mechanism for detecting user input at the user interface.

17. The system of claim 16 wherein the user interface displays a property sheet in response to user input corresponding to a selected directory.

18. The system of claim 17 wherein the mechanism for detecting user input at the user interface detects the setting of a property on the property sheet.

19. The system of claim 18 further comprising a mechanism connected to the user interface and configured to store a property setting corresponding to the detected property setting in the selected directory and at least one child directory thereof, such that at least one child directory inherits the property setting.

20. The system of claim 16 wherein the mechanism for detecting user input at the user interface detects a user request to enumerate a selected directory, and wherein the dynamic namespace integrator looks up at least one child directory hierarchically below the selected directory in response to the request.

21. A computer-readable medium having computer-executable instructions, comprising:
providing a physical namespace representing physical directories of a site, the site having a a hierarchical organization as perceived by a client;
providing a virtual namespace representing virtual directories of the site, at least one virtual directory being mapped to a physical directory of the site by an alias;
integrating the virtual namespace and the physical namespace into a hierarchical representation of the directories of the site that matches the hierarchical organization as perceived by the client; and
automatically propagating information across the virtual and physical directories based on the hierarchical organization of the integrated namespace.

22. The computer-readable medium of claim 21, further comprising: changing the mapping between the alias and the physical location of the virtual directory in response to moving the virtual directory to another physical location.

23. The computer-readable medium of claim 21, further comprising:
receiving input via a user interface,
displaying a property sheet in response to the input,
receiving additional input corresponding to a property setting, and
recording the property setting.

24. The computer-readable medium of claim 23, wherein recording the property setting comprises storing the property setting in a metabase.

25. The computer-readable medium of claim 24, wherein the metabase comprises a registry.

26. The computer-readable medium of claim 21, further comprising:
receiving input via a user interface corresponding to an enumeration request of a selected directory,
looking up at least one child directory hierarchically below the selected directory, and
displaying the at least one child directory on the user interface.

27. The method of claim 1 wherein one of the virtual directories has a name that collides with a name of one of the physical directories, and wherein integrating the first and second namespace information into the integrated namespace includes selecting the viral directory name for inclusion into the integrated namespace.

28. The method of claim 1 wherein integrating the first and second namespace information into the integrated namespace includes locating in the metabase virtual and physical directories having at least one property explicitly set, and searching for physical directories having no property explicitly set.

29. The system of claim 11 wherein the dynamic namespace integrator detects name collisions between physical and virtual directory names and integrates the first and second namespace information by selecting the virtual directory name upon detection of a name collision.

30. The system of claim 11 further comprising a metabase, and wherein the dynamic namespace integrator integrates the first and second namespace information by locating virtual and physical directories having at least one property explicitly set in the metabase, and searching for directories having no property explicitly set.

* * * * *

UNITED STATES PATENT AND TRADEMARK OFFICE
CERTIFICATE OF CORRECTION

PATENT NO. : 6,256,031 B1
DATED : July 3, 2001
INVENTOR(S) : Meijer et al.

It is certified that error appears in the above-identified patent and that said Letters Patent is hereby corrected as shown below:

Column 1,
Line 46, "exair/home" should read -- exair/ home --.

Column 2,
Line 40, "a exemplary" should read -- an exemplary --.
Line 55, "look up and the" should read -- look up the --.

Column 5,
Line 67, "763" should read -- $76_3$ --.

Column 7,
Line 65, "Server2" should read -- Server2 --.

Column 11,
Line 38, "a a hierarchical" should read -- a hierarchical --.

Column 12,
Line 7, "interfaces," should read -- interfaces; --.
Line 8, "input," should read -- input; --.
Line 10, "setting, and" should read -- setting; and --.
Line 21, "directory," should read -- directory; --.
Line 23, "directory, and" should read -- directory; and --.

Signed and Sealed this

Nineteenth Day of October, 2004

JON W. DUDAS
*Director of the United States Patent and Trademark Office*